(12) United States Patent
Ueda

(10) Patent No.: US 9,281,538 B2
(45) Date of Patent: Mar. 8, 2016

(54) THIN BATTERY AND BATTERY DEVICE

(75) Inventor: Tomohiro Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/820,439

(22) PCT Filed: Nov. 29, 2011

(86) PCT No.: PCT/JP2011/006638
§ 371 (c)(1),
(2), (4) Date: Mar. 1, 2013

(87) PCT Pub. No.: WO2012/140707
PCT Pub. Date: Oct. 18, 2012

(65) Prior Publication Data
US 2013/0177798 A1    Jul. 11, 2013

(30) Foreign Application Priority Data
Apr. 11, 2011  (JP) ................................ 2011-087021

(51) Int. Cl.
H01M 2/02      (2006.01)
H01M 10/04     (2006.01)
(Continued)

(52) U.S. Cl.
CPC ........ *H01M 10/0436* (2013.01); *H01M 10/052* (2013.01); *H01M 10/0565* (2013.01); *H01M 10/0585* (2013.01); *H01M 10/425* (2013.01); *H01M 4/382* (2013.01); *H01M 4/405* (2013.01); *H01M 4/661* (2013.01); *H01M 2220/30* (2013.01); *Y02E 60/122* (2013.01); *Y02P 70/54* (2015.11)

(58) Field of Classification Search
None
See application file for complete search history.

(56) References Cited

U.S. PATENT DOCUMENTS 4,208,473 A * 6/1980 Bradley .................... 429/112
6,025,087 A * 2/2000 Trosper ..................... 429/92
(Continued)

FOREIGN PATENT DOCUMENTS

| CN | 1314008 A | 9/2001 |
| JP | 05-151976 | 6/1993 |

(Continued)

OTHER PUBLICATIONS

Machine translation of JP 2003-346924, retrived from <http://www19.ipdl.inpit.go.jp/PA1/cgi-bin/PA1DETAIL> on May 13, 2014.*

(Continued)

*Primary Examiner* — Cynthia K Walls
(74) *Attorney, Agent, or Firm* — McDermott Will & Emery LLP

(57) ABSTRACT

Disclosed is a thin battery including an electrode assembly in sheet form and a housing for accommodating the electrode assembly. The electrode assembly includes a positive electrode, a negative electrode, and an electrolyte layer interposed therebetween. A lubricating material with a lubricating effect is interposed between an inner surface of the housing and the electrode assembly, and is, for example, an inert gas. The inert gas includes, for example, at least one of nitrogen and argon. It is preferable that the lubricating material is present, at least, between end surfaces of the electrode assembly on both sides in the thickness direction thereof and two main flat surfaces of the inner surface of the housing which face the end surfaces, respectively.

9 Claims, 5 Drawing Sheets

(51) Int. Cl.
*H01M 10/052* (2010.01)
*H01M 10/0565* (2010.01)
*H01M 10/0585* (2010.01)
*H01M 10/42* (2006.01)
*H01M 4/38* (2006.01)
*H01M 4/40* (2006.01)
*H01M 4/66* (2006.01)

(56) References Cited

U.S. PATENT DOCUMENTS

| | | | | |
|---|---|---|---|---|
| 6,087,036 | A | * | 7/2000 | Rouillard et al. ............... 429/66 |
| 6,106,972 | A | * | 8/2000 | Kokubo et al. ............... 429/120 |
| 6,106,973 | A | * | 8/2000 | Sonozaki et al. ............. 429/162 |
| 7,285,334 | B1 | | 10/2007 | Yamashita et al. |
| 2005/0064096 | A1 | | 3/2005 | Kurihara et al. |
| 2008/0138702 | A1 | | 6/2008 | Nakamura et al. |
| 2009/0123819 | A1 | * | 5/2009 | Kim ............... 429/120 |
| 2009/0305125 | A1 | * | 12/2009 | Kosugi et al. ................. 429/149 |
| 2010/0062328 | A1 | * | 3/2010 | Takagi ........................... 429/120 |
| 2010/0285341 | A1 | * | 11/2010 | Yun et al. ........................ 429/94 |

FOREIGN PATENT DOCUMENTS

| | | | |
|---|---|---|---|
| JP | 06-089705 | 3/1994 | |
| JP | 11-345599 | 12/1999 | |
| JP | 2001-222909 | 8/2001 | |
| JP | 2001-261763 | 9/2001 | |
| JP | 2002-260742 | 9/2002 | |
| JP | 2003-346924 | * 12/2003 | ............ H01M 10/50 |
| JP | 2005-78943 | 3/2005 | |
| JP | 2008-71732 | 3/2008 | |
| JP | 2009-004361 | 1/2009 | |

OTHER PUBLICATIONS

Machine translation of JP 05-151976, retrieved from <https://www.j-platpat.inpit.go.jp/web/all/top/BTmTopEnglishPage> on Apr. 29, 2015.*

International Search Report for PCT/JP2011/006638 with date of mailing Mar. 6, 2012.

Chinese Office Action with partial English translation issued in the corresponding Chinese Patent Application No. 201180042733.6 mailed Feb. 3, 2015.

* cited by examiner

F I G. 1
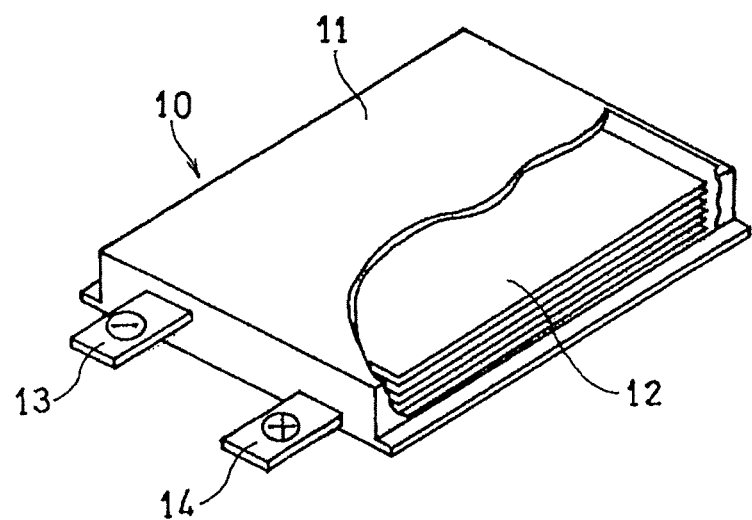
F I G. 2
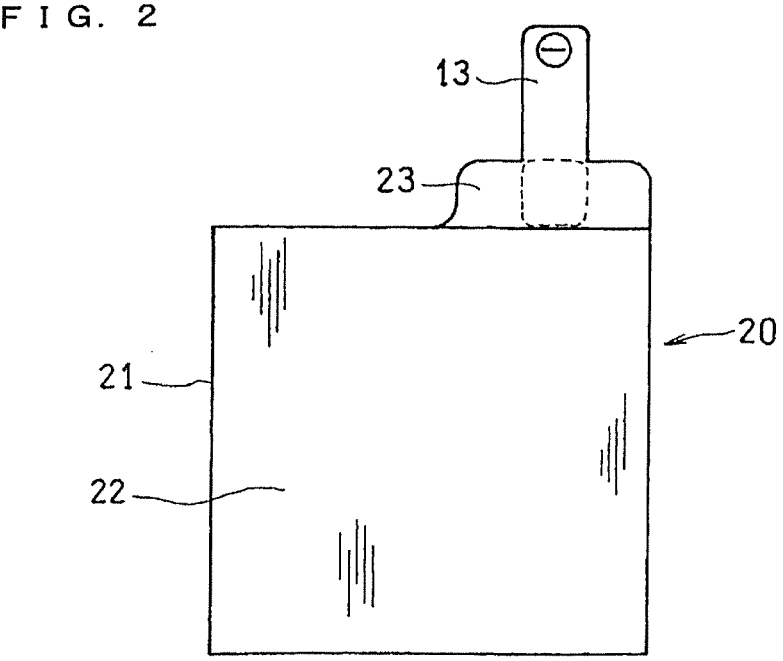

THIN BATTERY AND BATTERY DEVICE

RELATED APPLICATIONS

This application is the U.S. National Phase under 35 U.S.C. §371 of International Application No. PCT/JP2011/006638, filed on Nov. 29, 2011, which in turn claims the benefit of Japanese Application No. 2011-087021, filed on Apr. 11, 2011, the disclosures of which Applications are incorporated by reference herein.

TECHNICAL FIELD

The present invention relates to a thin battery with improved flexibility, the thin battery including an electrode assembly in sheet form and a housing for accommodating the same.

BACKGROUND ART

In recent years, there has been progress in portable electronic devices that are compact in design, such as cellular phones and hearing aids. Among such portable electronic devices, there is a gradual increase in demand for devices that operate in contact with a living body. For example, development is in progress for a biological information signal generating device capable of measuring and monitoring biological information such as body temperature, blood pressure, and pulse, and automatically notifying such biological information to facilities such as hospitals. Moreover, development is also in progress for a body-pasting device capable of supplying medicine, etc. through the outer skin of a living body by application of voltage.

Under such circumstances, a compact design is also demanded of batteries which supply power to the portable electronic devices. That is, thin and flexible batteries are in demand. Examples of thin batteries that have been developed until now, include paper batteries, thin flat batteries, and plate batteries. However, since such batteries use high-strength housings, there is the problem of having difficulty in making the batteries more flexible and thin.

Therefore, development is in progress for a thin battery which uses a thin, flexible laminate film for the housing (c.f., Patent Literatures 1 and 2). For example, to obtain a thin battery, a positive electrode and a negative electrode, both in sheet form, are stacked with a separator interposed therebetween; a positive lead and a negative lead are connected to the positive electrode and the negative electrode, respectively; and the resultant is wrapped with a laminate film, such that the leads are partially exposed to the outside.

A thin battery which uses a laminate film for its housing can be formed thinner than a conventional thin battery, and is therefore advantageous in terms of energy density. Moreover, the stacked structure of the electrodes connected in series or in parallel inside the housing, facilitates improvements in voltage and capacity.

Here, in the electrode assembly for a thin battery, the positive electrode and the negative electrode are integrated together by having an electrolyte layer interposed therebetween, thereby allowing the positive and negative electrodes to adhere to each other. Adhesion between the electrodes is important for realizing improvements in energy density and high-load characteristics, and reduction in internal resistance. That is, reduced adhesion between the electrodes would cause significant deterioration in various characteristics of the battery.

Therefore, in the process for producing a thin battery, when performing thermal welding to seal the housing accommodating the electrode assembly, the housing and the electrode assembly are machine pressed under reduced pressure. This is considered to suppress creation of space between the housing and the electrode assembly, and to thus facilitate maintaining adhesion between the electrodes (c.f., Patent Literatures 3 and 4).

PRIOR ART

Patent Literature

[Patent Literature 1] Japanese Laid-Open Patent Publication No. Hei 11-345599
[Patent Literature 2] Japanese Laid-Open Patent Publication No. 2008-71732
[Patent Literature 3] Japanese Laid-Open Patent Publication No. Hei 6-89705
[Patent Literature 4] Japanese Laid-Open Patent Publication No. Hei 5-151976

SUMMARY OF INVENTION

Technical Problem

However, when space is not allowed to be created between the housing and the electrode assembly, the thin battery tends to become stiff, due to application of atmospheric pressure to the housing and the electrode assembly. Thus, the thin battery would lack sufficient flexibility when it is used for applications requiring high flexibility, as with portable electronic devices which operate in contact with a living body.

Therefore, the present invention aims to secure adhesion between the electrode and to improve flexibility of the thin battery.

Solution to Problem

The present inventors conducted studies to solve the above problem. In the process of their studies, they thought that flexibility was not sufficient in conventional thin batteries, due to large amounts of friction acting between the electrode assembly and the inner surface of the housing. Moreover, they found that it was effective to interpose a lubricating material capable of reducing friction, such as an inert gas, between the electrode assembly and the housing. Thus, they were able to reach completion of the present invention.

That is, the present invention is directed to a thin battery comprising an electrode assembly in sheet form and a housing for accommodating the electrode assembly, the electrode assembly including a positive electrode, a negative electrode, and an electrolyte layer interposed between the positive electrode and the negative electrode; and a lubricating material with a lubricating effect, being interposed between an inner surface of the housing and the electrode assembly.

Herein, the lubricating material is preferably an inert gas.

The present invention is also directed to a battery device comprising the foregoing thin battery and an electronic device which is driven by power supplied from the thin battery, the thin battery and the electronic device being integrated together to form a sheet.

Advantageous Effects of Invention

The thin battery of the present invention has high flexibility, and is therefore capable of being installed in various devices which require high flexibility. For example, by having the thin battery installed in a body-pasting device which operates in contact with a living body, the device can be well attached to the living body. As a result, almost no discomfort would be felt, even when the device is used for a long period of time. Moreover, even if the device is repeatedly bent, battery characteristics would be prevented from rapidly deteriorating since adhesion is secured between the electrodes.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 1 is an oblique view of a partially cut-away thin battery according to one embodiment of the present invention.

FIG. 2 is a plan view of a negative electrode according to one embodiment of the present invention.

DESCRIPTION OF EMBODIMENT

Figure 3:
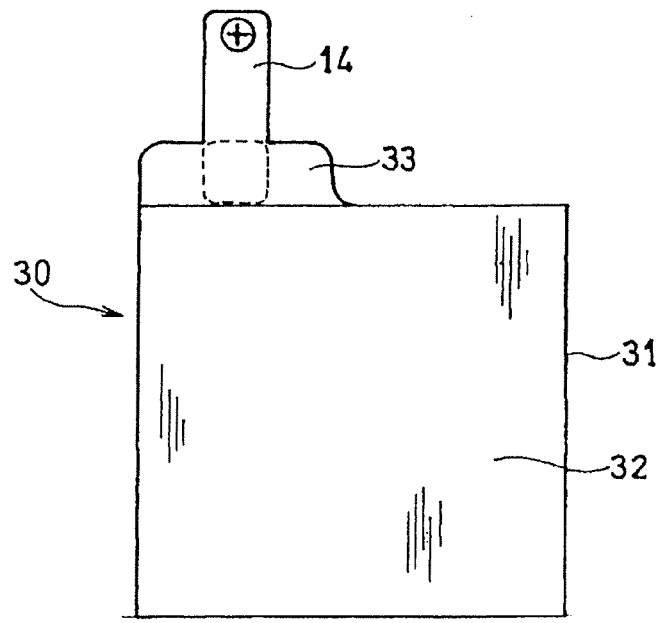
FIG. 3 is a plan view of a positive electrode according to one embodiment of the present invention.

The present invention is directed to a thin battery comprising an electrode assembly in sheet form and a housing for accommodating the electrode assembly, the electrode assembly including a positive electrode, a negative electrode, and an electrolyte layer interposed between the positive electrode and the negative electrode, and a lubricating material with a lubricating effect, being interposed between an inner surface of the housing and the electrode assembly. The entire thin battery is given good flexibility, by interposing the lubricating material with a lubricating effect between the inner surface of the housing and the electrode assembly.

For the lubricating material to give the thin battery high flexibility, it is preferable that it is present, at least, between end surfaces of the electrode assembly on both sides in a thickness direction thereof, and two main flat surfaces of the inner surface of the housing which face the end surfaces of the electrode assembly, respectively (hereinafter referred to as interface between the electrode assembly and the inner surface of the housing). The interposition of the lubricating material therebetween enables reduced friction at the interface between the electrode assembly and the inner surface of the housing. Thus, resistance of the thin battery against bending is reduced, and its flexibility improves.

Herein, "end surfaces of the electrode assembly on both sides in a thickness direction thereof" mean two surfaces with the largest areas which face each other, when the electrode assembly is regarded as having a rectangular body. Moreover, "two main flat surfaces of the inner surface of the housing which face the end surfaces of the electrode assembly, respectively" mean parts of the inner surface of the housing, which face the above two surfaces of the electrode assembly facing each other. That is, the total area S of the two main flat surfaces of the inner surface of the housing, is the same as the sum of the areas of the two surfaces of the electrode assembly facing each other.

In the case where the electrode assembly is, for example, a stacked type, the end surfaces of the electrode assembly on both sides in the thickness direction thereof, correspond to a surface of the positive or negative electrode on the outermost side. This surface may be a surface of an active material layer of the positive or negative electrode; or may be an exposed portion of a current collector sheet without the active material layer formed thereon. Moreover, in the case where the electrode assembly is wound into a flat shape, the end surfaces of the electrode assembly on both sides in the thickness direction thereof, are the outer surface of the electrode which results on the outermost side of the electrode assembly, when wound.

The lubricating material can scarcely enter the interstices in the electrode assembly. This is because the electrode assembly is impregnated with an electrolyte. Moreover, most part of the inner surface of the housing which accommodates the electrode assembly, faces the end surfaces of the electrode assembly on both sides in the thickness direction thereof. Therefore, the extent to which flexibility of the thin battery improves, can be controlled by the V/S ratio between the volume V μL of the lubricating material filled in the housing, and the total area S cm$^2$ of the two main flat surfaces of the inner housing surface. That is, there is good correlation between the amount of the lubricating material interposed at the interface between the electrode assembly and the inner housing surface, and the V/S ratio.

The V/S ratio is preferably 0.5 μL/cm or more and 7 μL/cm$^2$ or less. Moreover, in this case, the total area S cm$^2$ of the two main flat surfaces is preferably 10 to 1,500 cm$^2$.

By making the V/S ratio 0.5 μL/cm$^2$ or more, the amount of the lubricating material interposed at the interface between the electrode assembly and the inner housing surface is sufficiently secured, and this facilitates improvement in flexibility of the battery. Moreover, by making the V/S ratio 7 μL/cm$^2$ or less, the space between the housing and the electrode assembly does not become too large, and at an appropriate timing, a moderate amount of pressure is applied to the electrode assembly. Therefore, adhesion between the electrodes is secured, and battery performance does not easily deteriorate even at times of repeated bending. That is, by the V/S ratio satisfying the relation between 0.5 μL/cm$^2$ or more and 7 μL/cm$^2$ or less, the effect of improved flexibility of the battery increases, and adhesion between the electrodes is unlikely to become any less.

The lower and upper limits of the V/S ratio are further preferably 1 μL/cm$^2$ and 5 μL/cm$^2$, respectively. The lower and upper limits of the V/S ratio can be combined arbitrarily by referring to their respective ranges given above.

Considering flexibility, as well as feeling of comfort to a human body when attached, the thin battery preferably has a thickness of 1 mm or less, and further preferably 0.7 mm or less, although not particularly limited thereto. However, the thin battery could realize a relatively good attachment, if it has a thickness of about 5 mm or less. Note that it is technically difficult to make the battery thickness less than 50 μm, but there is no particular limitation to the lower thickness limit. The thickness of the thin battery is preferably in the range of, for example, 100 μm or more and 1 mm or less.

Note that the thickness of the thin battery is the distance between the two outer surfaces of the housing that have the largest areas, when the battery is regarded as having a rectangular body. When the value of the thickness differs depending on where it is measured, the maximum value measured is regarded as the battery thickness.

The thin battery is regarded as such, as long as it is thin and flexible; and may be in the form of a flat or curved plate. The thin battery may be a primary or secondary battery.

[Lubricating Material]

The lubricating material differs from the electrolyte with which the electrode assembly is impregnated; and may be any material as long as it does not cause great damage to battery characteristics and has a lubricating effect. The lubricating material is a material with flowability, and may be in gas or liquid form. However, gas is preferable in terms of easy handling and low cost, and air and an inert gas are further preferable. Examples of the inert gas preferably include noble gases and nitrogen, in terms of not easily causing a side reaction with the positive or negative electrode. For the noble gas, any one of helium, neon, argon, krypton, xenone, and radon can be used. Among these, air, nitrogen, argon, and a mixed gas thereof are particularly preferable, in terms of availability and low cost.

[Housing]

The housing is preferably made of a material having excellent bending resistance and high flexibility (e.g., a film-like material). Specifically, in one embodiment of the present invention, the housing is made of a laminate film including a water vapor barrier layer and a resin layer formed on one or both surfaces of the barrier layer. The barrier layer is a metal or ceramic layer.

In terms of strength and bending resistance, the metal layer is preferably formed from aluminum, titanium, nickel, stainless steel, gold, silver, or the like. Moreover, the ceramic layer is preferably formed from silicon oxide, magnesium oxide, aluminum oxide, or the like. Among these, aluminum, aluminum oxide, and silicon oxide are particularly preferable, in terms of enabling low production costs and having excellent barrier properties.

The thickness of the barrier layer is preferably 5 to 50 μm. The thickness of the resin layer on the inner and outer surface sides of the housing, is preferably 5 to 100 μm. The thickness of the laminate film is preferably 15 to 300 μm and further preferably 30 to 150 μm. By using the laminate film with such thickness, the thin battery is easily made thinner, while strength and flexibility of the housing is also secured.

In terms of strength, impact resistance, and electrolyte resistance, examples of the resin layer formed on the inner surface side of the housing preferably include: polyolefins such as polyethylene (PE), polypropylene (PP), and modified products thereof; polyethylene terephthalate (PET); polybutylene terephthalate (PBT); polyamide; polyurethane; polyethylene-vinyl acetate copolymer (EVA); and ionomer resin. Surface roughness of the resin layer on the inner surface side of the housing, is typically 0.01 to 1 μm.

In terms of strength, impact resistance, and chemical resistance, the resin layer formed on the outer surface side of the housing preferably include: polyamides (PA) such as nylon 6,6 and nylon 6; and polyesters such as PET and PBT.

Specifically, examples of the material for the housing include: a laminate film of acid-modified PP/PET/Al layer/PET; a laminate film of acid-modified PE/PA/Al layer/PET; a laminate film of ionomer resin/Ni layer/PE/PET; a laminate film of EVA/PE/Al layer/PET; and a laminate film of ionomer resin/PET/Al layer/PET. Moreover, a ceramic layer such as a $Al_2O_3$ layer, a $SiO_2$ layer, or the like may be used in place of the Al layer and the Ni layer.

[Electrode Assembly]

Although the structure of the electrode assembly in sheet form is not particularly limited, in a preferred embodiment, the electrode assembly includes: a first electrode including a first current collector sheet, and a first active material layer adhering to one surface of the sheet; a second electrode including a second current collector sheet, and a second active material layer adhering to one surface of the sheet; and an electrolyte layer interposed between the first and second active material layers. The other surfaces of the first and second current collector sheets, respectively, are in contact with the inner surface of the housing.

The electrode assembly as above basically has a structure in which one layer of the first electrode and one layer of the second electrode are attached. That is, it has a three-layered structure consisting of the positive electrode, the electrolyte layer, and the negative electrode (or a five-layered structure consisting of the positive electrode current collector sheet, the positive electrode active material layer, the electrolyte layer, the negative electrode active material layer, and the negative electrode current collector sheet). However, note that the present invention does not exclude a thin battery including an electrode assembly which further includes at least one additional positive electrode and at least one additional negative electrode, between the positive electrode and the negative electrode which are at the ends of the electrode assembly, respectively.

In another preferred embodiment, the electrode assembly includes: a pair consisting of first electrodes each including a first current collector sheet and a first active material layer adhering to one surface of the sheet; a second electrode including a second current collector sheet and a second active material layer adhering to both surfaces of the sheet; and electrolyte layers each interposed between the first and second active material layers. The other surfaces of the first current collector sheets, respectively, are in contact with the inner surface of the housing.

The electrode assembly as above basically has a structure in which one layer of the second electrode is sandwiched between two layers of the first electrode (i.e., a pair thereof). That is, it has a five-layered structure consisting of: a pair of the first electrodes which are the outermost layers; the second electrode which is the inner layer; and two layers of the electrolyte layer, each interposed between the first and second electrodes. However, note that the present invention does not exclude a thin battery including an electrode assembly which has a structure with more than five layers, the structure further including at least one additional layer of the first electrode and at least one additional layer of the second electrode.

Moreover, the present invention does not exclude a thin battery including an electrode assembly in which one layer of the first electrode and one layer of the second electrode are stacked and wound into a flat shape.

[Electrode]

Electrodes in sheet form are used, such electrodes being suitable for thin batteries. The planar shape of the electrodes is not particularly limited, but is preferably circular, elliptic, strip-like, rectangular, or close to rectangular. A shape that is close to rectangular is, for example, a rectangular shape with four beveled corners, or a rectangular shape with four arc-like (round) corners.

(Negative Electrode)

In one embodiment of the present invention, the negative electrode includes a negative electrode current collector sheet, and a negative electrode active material layer adhering to one or both surfaces of the sheet. The negative electrode active material layer is formed by allowing a negative electrode active material to be pressure bonded or vapor deposited on the negative electrode current collector sheet; or by applying to the negative electrode current collector, a material mixture containing a negative electrode active material, and then rolling the resultant.

For the negative electrode active material, a known material and composition can be selected as appropriate. Moreover, by using one among a lithium-based negative electrode, various natural and artificial graphites, silicides, silicon oxides, various alloy materials, and the like, a thin battery having a high energy density can be obtained. Among these, a lithium-based negative electrode is preferable, in terms of being able to realize a thin battery with higher capacity and higher energy density.

When using a lithium-based negative electrode, the negative electrode active material layer is preferably a lithium metal layer, or a lithium alloy layer, having a high capacity. As the lithium alloy, for example, a Li—Si alloy, a Li—Sn alloy, a Li—Al alloy, a Li—Ga alloy, a Li—Mg alloy, a Li—In alloy, or the like is used. In view of improving the capacity of the negative electrode, the content of element other than Li in the lithium alloy, is preferably 0.1 to 10 mass %.

A metal foil can be used as the negative electrode current collector sheet. The metal foil may be an electrolytic metal foil obtained through electrolysis, or may be a rolled metal foil obtained through rolling. An electrolytic metal foil is obtained, for example, by immersing a drum serving as an electrode into an electrolytic bath containing ions of a predetermined metal; rotating the drum while simultaneously passing current therethrough, thereby allowing the predetermined metal to be deposited on the drum surface; and then separating the deposited metal from the drum surface. The advantages of electrolysis are excellent productivity and relatively low cost. The advantages of rolling are facilitated thinning of the metal foil and weight reduction. A rolled metal foil has excellent bending resistance due to crystals aligned thereon in the rolling direction, and is thus favorably used in thin batteries.

The surface of the negative electrode current collector sheet may be smoothed or roughened. Smoothing of the negative electrode current collector sheet is performed by bright plating, electrolytic polishing, rolling or the like. As an example of roughening of the negative electrode current collector sheet, blasting can be given. In blasting, surface roughness of the negative electrode current collector sheet can be easily controlled by changing the ejection pressure, ejection distance, and processing time. Moreover, metal may be deposited on the surface of a rolled metal foil, by electrolysis. For example, metal may be deposited on the surface of a metal foil in an acidic electrolyte bath, at a high current density close to critical current density. After the above surface treatment, the negative electrode current collector may be further subjected to chromating, to increase corrosion resistance. The thickness of the negative electrode current collector sheet is, for example, 5 to 30 μm.

When the negative electrode active material layer is a lithium metal layer or a lithium alloy layer, since the surface area of the active material is small, it is preferable to increase the binding strength between the negative electrode current collector sheet and the negative electrode active material layer. In terms of the above, surface roughness of the current collector sheet for the surface in contact with the active material layer (hereinafter, simply referred to as current collector surface roughness) is preferably 0.3 μm or higher and 10 μm or lower, and further preferably 0.4 to 10 μm. By making the current collector surface roughness 0.3 μm or higher, it is possible to realize sufficient anchor effect between the current collector sheet and the active material layer, and to obtain high adhesion between the current collector sheet and the active material layer. Moreover, by making the current collector surface roughness 10 μm or lower, the current collector sheet is less prone to local load when the battery is bent, and is less prone to damages.

Herein, surface roughness means the 10-point average roughness (Rz) that is specified by JIS Standard B0601. The 10-point average roughness (Rz) is the sum of: the average of the absolute values for the heights of the five highest peaks; and the average of the absolute values for the depths of the five lowest valleys, these peaks and valleys being a part of a surface waviness corresponding to standard length L. Measurements of their heights and depths are made, starting from the average line of the part.

(Electrolyte Layer)

The electrolyte layer serves to separate the positive electrode and the negative electrode, and also includes an electrolyte which serves to move ions. The electrolyte may be in liquid, gelled, or solid form. A non-aqueous electrolyte is particularly preferable in terms of having a wide potential window. Components other than the electrolyte may be included in the electrolyte layer, as long as the purpose of the electrolyte layer is not lost. For example, a filler composed of inorganic particles, resin particles, or the like may be added to the electrolyte layer, for the purpose of improving the strength, homogeneity, ion conductivity, etc. of the electrolyte layer. Examples of the inorganic particles include fine alumina particles, fine silica particles, and the like. Moreover, a non-woven fabric, a drawn resin sheet, or the like may be included as a separator (microporous sheet) in the electrolyte layer, for preventing short circuits between the positive electrode and the negative electrode.

The separator has ion permeability, and preferably has excellent mechanical strength and insulating properties. Examples of a material for such a separator include polypropylene, polyethylene, cellulose, polyethylene terephthalate, polyphenylene sulfide, polyamide, and polyimide. Among drawn sheets, a microporous film including at least one of polypropylene and polyethylene is preferable in terms of having a shutdown function. Moreover, when a separator is such a microporous film with a layer of a highly heat-resistant material such as polyamide laminated on the film surface, it has an excellent short-circuit resistance in addition to a shutdown function.

An example of a liquid electrolyte, is a solution made of a solvent and a solute (supporting salt) dissolved therein, being capable of containing various additives.

A typical example of a gelled electrolyte (gel polymer electrolyte) is a gel made of a liquid electrolyte, and a polymeric material impregnated with the liquid electrolyte. The polymeric material which serves as the matrix for the gel polymer electrolyte may be of any material capable of absorbing the liquid electrolyte to be gelled; and examples thereof include: silicone; poly(meth)acrylate-based polymers mainly composed (i.e., 90 mol % or more) of ester units of acrylic acid, acrylic ester, methacrylic acid, or methacrylic ester; polyacrylonitrile; polyphosphazene; polyethylene oxide; polypropylene oxide; and fluorocarbon polymer. These polymeric materials may be used singly, or as a mixture or composite of two or more; and may be cross-linked or modified as appropriate.

Among the foregoing polymeric materials, fluorocarbon polymer particularly has high resistance against oxidation and reduction, and is suited for absorbing a non-aqueous electrolyte in liquid form. For example, the following compounds are preferably used singly or in combination of two or more: polyvinylidene fluoride, vinylidene fluoride-hexafluoropropylene copolymer, vinylidene fluoride-trifluoroethylene copolymer, and vinylidene fluoride-tetrafluoroethylene copolymer.

Examples of a solid electrolyte include: powders and deposited films of various inorganic solid electrolytes; and dry polymer electrolytes. Examples of inorganic solid electrolytes include: lithium halide such as lithium iodide, and derivatives thereof; lithium nitride; oxoacid salt-based materials; and sulfide-based materials. Dry polymer electrolytes are polymeric materials to which a solute (supporting salt) is added, and do not contain a solvent.

Examples of a polymeric material which serves as the matrix for the dry polymer electrolyte include: ether-based polymers such as polyethylene oxide and cross-linked matter thereof; and poly(meth)acrylate-based polymers. These may be a homopolymer formed from a single monomer, or may be a copolymer formed from two or more kinds of monomers. Moreover, these polymeric materials may be used singly, or as a mixture or composite of two or more.

Among the foregoing, the electrolyte layer including the dry polymer electrolyte or the gel polymer electrolyte is preferable, in terms of preventing the electrolyte components from leaking to the outside when the housing is damaged. Various kinds of fillers may be added to the dry or gel polymer electrolyte. Moreover, a separator serving as a support may be impregnated with, or may have adhered thereto, the dry or gel polymer electrolyte; and the result may be used as the electrolyte layer.

When the dry polymer electrolyte or the gel polymer electrolyte is used, means to prevent liquid leakage is not required. This facilitates size reduction, weight reduction, and further thinning of the thin battery; and also facilitates increase in energy density of the thin battery. Furthermore, by using the dry or gel polymer electrolyte, the electrolyte layer is also given the ability to follow bending. This further improves adhesion between the electrodes, and remarkably suppresses variation and deterioration in battery performance even after the battery is repeatedly bent.

(Positive Electrode)

In one embodiment of the present invention, the positive electrode includes a positive electrode current collector sheet, and a positive electrode active material layer adhering to one or both surfaces of the sheet. The positive electrode active material layer is formed by allowing a positive electrode active material to be vapor deposited on the positive electrode current collector sheet; or by applying a material mixture containing a positive electrode active material to the sheet, and then rolling the resultant. The positive electrode material mixture contains a binder in addition to the positive electrode active material, and contains a conductive agent as necessary.

Examples of the positive electrode active material include: manganese dioxide; fluorinated carbons; organic or inorganic sulfides; lithium-containing composite oxides; metal oxides such as a vanadium oxide and a niobium oxide, and lithium compounds thereof; conjugated organic polymers having conductivity; Chevrel compounds; and olivine-based compounds. Among these, manganese dioxide, fluorinated carbons, sulfides, and lithium-containing composite oxides are preferable, and manganese dioxide is particularly preferable.

When the reaction of manganese dioxide inside the battery is assumed to be a one-electron transfer reaction, the theoretical capacity per mass of the positive electrode active material would be 308 mAh/g, which is high. Moreover, manganese dioxide is not costly. Among the different kinds of manganese dioxide, electrolytic manganese dioxide is particularly preferable in terms of being easy to obtain. Manganese dioxide may contain a small amount of impurities that are unavoidable in the production process. The positive electrode active material may be a mixture mainly composed of manganese dioxide, which contains a material other than manganese dioxide such as a fluorinated carbon, a vanadium oxide, or an olivine-based compound.

Examples of fluorinated carbons include fluorinated graphites represented by the formula $(CF_w)_m$, where m is an integer of 1 or more, and $0<w\leq1$. Examples of sulfides include $TiS_2$, $MoS_2$, and $FeS_2$. Examples of lithium-containing composite oxides include $Li_{xa}CoO_2$, $Li_{xa}NiO_2$, $Li_{xa}MnO_2$, $Li_{xa}Co_yNi_{1-y}O_2$, $Li_{xa}Co_yM_{1-y}O_z$, $Li_{xa}Ni_{1-y}M_yO_z$, $Li_{xb}M_2O_4$, and $Li_{xb}Mn_{2-y}M_yO_4$, where M is at least one element selected from the group consisting of Na, Mg, Sc, Y, Mn, Fe, Co, Ni, Cu, Zn, Al, Cr, Pb, Sb, and B; xa=0 to 1.2; xb=0 to 2; y=0 to 0.9; and z=2 to 2.3. The values of xa and xb are values before charge and discharge are started, and fluctuate depending on charge and discharge.

Examples of the conductive agent include: graphites such as natural graphite and artificial graphite; carbon blacks such as acetylene black, ketjen black, channel black, furnace black, lamp black, and thermal black; conductive fibers such as carbon fibers and metal fibers; metal powders such as aluminum powder; conductive whiskers such as zinc oxide whiskers and potassium titanate whiskers; conductive metal oxides such as titanium oxide; and organic conductive materials such as phenylene derivatives. These may be used singly or in combination of two or more. In terms of improving conductivity of the positive electrode active material layer and of the capacity of the positive electrode, the content of the conductive agent in the positive electrode active material layer is preferably 1 to 30 parts by mass per 100 parts by mass of the positive electrode active material.

Examples of the binder include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, poly methacrylic acid, polymethyl methacrylate, polyethyl methacrylate, polyhexyl methacrylate, polyvinyl acetate, polyvinylpyrrolidone, polyether, polyether sulfone, hexafluoropolypropylene, styrene-butadiene rubber, and carboxymethyl cellulose. These may be used singly or in combination of two or more. In terms of improving binding properties of the positive electrode active material layer, and of securing the capacity of the positive electrode, the content of the binder in the positive electrode active material layer is preferably 1 to 15 parts by mass per 100 parts by mass of the positive electrode active material.

Another example of the binder is a polymer electrolyte. The presence of a polymer electrolyte in the positive electrode active material layer allows smooth diffusion of lithium ions throughout the layer, which facilitates transfer of lithium ions between the positive electrode current collector and the positive electrode active material layer. Only the polymer electrolyte may be used singly as the binder, or it may be used in combination with another binder.

The positive electrode current collector sheet may be a metal film, a metal foil, or a non-woven fabric made of metal fibers. Examples of a metal material used to form the positive electrode current collector sheet are silver, nickel, palladium, gold, platinum, aluminum, an aluminum alloy, and stainless steel. These may be used singly, or in combination of two or more, to form the current collector sheet. The thickness of the positive electrode current collector sheet is, for example, 1 to 30 µm.

Next, a thin battery according to one embodiment of the present invention will be described with reference to the drawings.

As conceptually shown in FIG. 1, a thin battery 10 comprises an electrode assembly 12, and a housing 11 for accommodating the electrode assembly 12. Although the electrode assembly 12 is conceptually illustrated as being thick in FIG. 1, it is actually in the form of a thinner sheet. FIG. 2 is a plan view of one example of a negative electrode 20 included in the electrode assembly 12; and FIG. 3 is a plan view of one example of a positive electrode 30 included in the electrode assembly 12. The electrode assembly 12 includes the negative electrode 20 and the positive electrode 30 which are stacked with an electrolyte layer (not shown) interposed therebetween.

The negative electrode 20 is formed from a negative electrode current collector sheet 21, and a negative electrode active material layer 22 disposed on one or both surfaces of the negative electrode current collector sheet 21. The positive electrode 30 is formed from a positive electrode current collector sheet 31, and a positive electrode active material layer 32 disposed on one or both surfaces of the positive electrode current collector sheet 31. Moreover, the negative electrode 20 and the positive electrode 30 are arranged, such that the negative electrode active material layer 22 and the positive electrode active material layer 32 face each other with the electrolyte layer interposed therebetween.

The negative electrode current collector sheet 21 and the positive electrode current collector sheet 31 have a planar shape that is rectangular or close to rectangular, the sheet 21 having a negative electrode current collector protruding portion 23 which extends from one side thereof, and the sheet 31 having a positive electrode current collector protruding portion 33 which extends from one side thereof. A negative lead 13 is connected to the negative electrode current collector protruding portion 23, and a positive lead 14 is connected to the positive electrode current collector protruding portion 33. These leads extend from inside of the housing 11, to the outside. The parts of the negative and positive leads which extend outward from the housing 11 serve as a negative terminal and a positive terminal, respectively. For both of the leads, at least one corner may be beveled. By shaping the leads as such, it is possible to prevent the protruding portions from damages as those caused when the leads get caught.

[Method for Producing Thin Battery]

The electrode assembly is produced, for example, in the following manner.

First, the negative electrode and the positive electrode are arranged such that the negative electrode active material layer and the positive electrode active material layer face each other; and then, the negative and positive electrodes are stacked with the electrolyte layer interposed therebetween, thereby producing an electrode assembly. At this time, the negative lead is attached to the negative electrode in advance, and the positive lead is attached to the positive electrode in advance.

In the case of using two or more of the positive electrode or of the negative electrode, two or more of the positive electrode current collector protruding portion, or of the negative electrode current collector protruding portion, may be electrically connected to one another in parallel, when producing the electrode assembly. Alternatively, the positive electrode current collector protruding portion and the negative electrode current collector protruding portion may be electrically connected to each other in series. Electrical connection can be performed by welding or riveting.

On the other hand, the housing and the thin battery are produced in the following manner.

First, a strip-like laminate film is folded in half, such that the ends meet; and then the end portions are welded together, thereby forming a tubular body. After the electrode assembly is inserted into the tubular body from one opening thereof, the one opening is closed by thermal welding. At this time, the electrode assembly is positioned, such that the positive and negative leads partially extends out from, and are thus exposed at, the one opening that is closed by thermal welding. Subsequently, the tubular body with the electrode assembly inserted therein, is introduced into an atmosphere that includes, for example, an inert gas serving as a lubricating material, and that is also adjusted to a predetermined pressure; and in this atmosphere, the other end of the tubular body is closed by thermal welding. In this manner, the housing can be sealed, with a predetermined amount of the inert gas filled therein, together with the electrode assembly inserted therein. Filled inside the housing of the battery soon after production, is a gas having the same composition as the atmospheric gas during the thermal welding.

Figure 4:
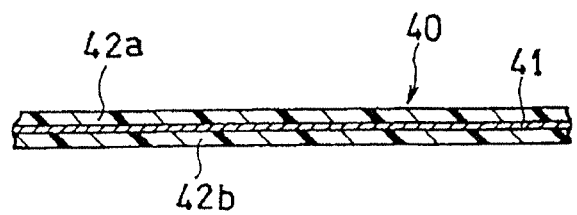
FIG. 4 is a vertical sectional view of one example of a laminate film.

FIG. 4 is a vertical sectional view of one example of a laminate film which forms the housing.

A laminate film 40 is formed from a water vapor barrier layer 41; and a resin layer 42a and a resin layer 42b formed on one surface and the other surface, respectively, of the barrier layer 41.

By opening the thin battery after production and analyzing the gas composition inside the housing, the amount V µL of the inert gas filled inside the battery can be measured. The ratio V/S can be calculated from the value obtained for V, and the total area S cm$^2$ of the two main flat surfaces of the inner housing surface which face the electrode assembly.

[Battery Device]

Next, a battery device comprising the above-described thin battery and an electronic device driven by power supplied from the thin battery, will be described.

The thin battery of the present invention is suited for application in battery devices comprising a thin battery and an electronic device which integrate together to form one sheet.

Recently, in the medical field, for doctors, etc. to monitor the biological information of patients, etc., various electronic devices such as a body-pasting device, etc. are being developed. An example of such a body-pasting device, is a biological information measuring device which comes in contact with the skin of a living body; regularly measures biological information which includes blood pressure, body temperature, and pulse; and wirelessly transmits the measurements. Likewise, development is in progress for an iontophoretic dermal administration device as a body-pasting device, to which a predetermined potential is applied to enable supplying of medicine into a living body thorough its outer skin.

A body-pasting device is also referred to as a wearable portable digital assistant; and since it is close to a living body when used, it is required to have flexibility to the extent of not giving discomfort to the user, even when close to the skin for a long period of time. Therefore, the driving power source for a body-pasting device is also required to have excellent flexibility. The thin battery of the present invention is useful as a power source for such a device. A biological information measuring device and an iontophoretic dermal administration device are both suited for integration with a thin battery to form one sheet.

Figure 5:
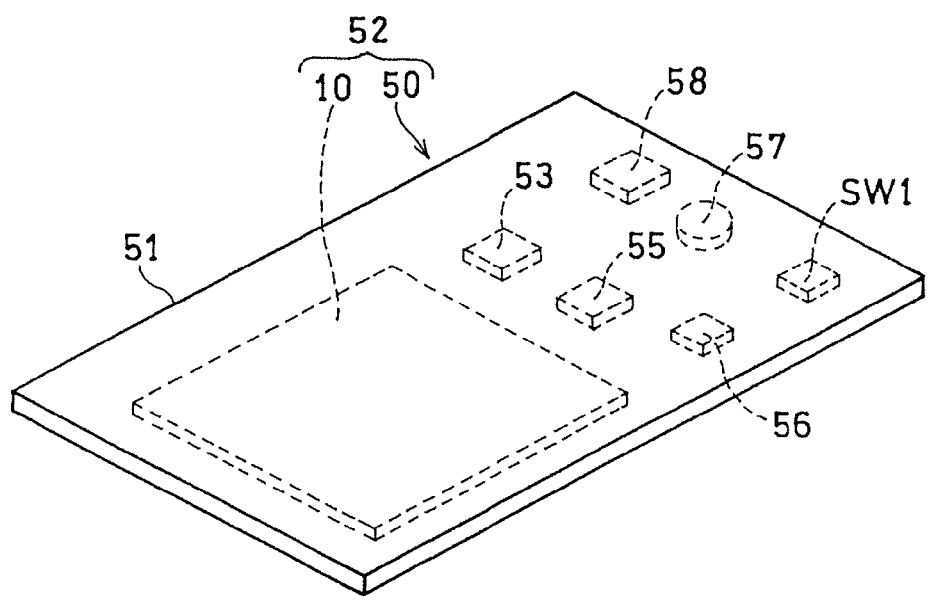
FIG. 5 is an oblique view of one example of a battery device in sheet form including a biological information measuring device.
Figure 6:
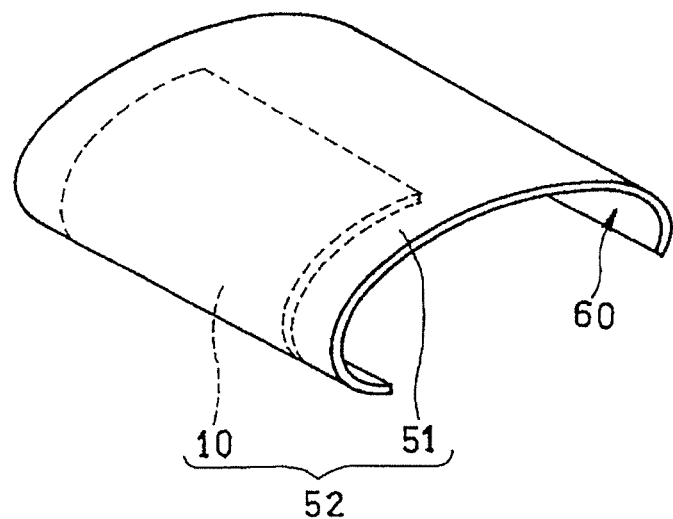
FIG. 6 is one example of the exterior of the battery device when deformed.

FIG. 5 is an oblique view of one example of a battery device 52 in sheet form which includes a biological information measuring device. FIG. 6 shows one example of the exterior of the battery device 52 when deformed.

A biological information measuring device 50 includes a holding member 51 in sheet form for holding the components of the device 50. The holding member 51 is made of a flexible material; and a temperature sensor 53, a pressure sensitive element 55, a memory 56, an information transmitter 57, a button switch SW1, and a controller 58 are embedded therein, the occupied spaces extending from inside, up to the surface. The thin battery 10 occupies a flat space provided inside the holding member 51. That is, the thin battery 10 and the biological information measuring device 50 are integrated together to form one sheet, thereby producing a battery device 52.

For example, an electrically insulating resin material may be used for the holding member 51. By applying to one main surface of the battery device 42, an adhesive 60 with adhesion, for example, it would be possible for the biological information measuring device 50 to be strapped around the wrist, ankle, neck, etc. of the user.

The temperature sensor 53 includes, for example, a heat sensitive element such as a thermistor or thermocouple; and outputs signals indicating body temperature of the user, to the controller 58. The pressure sensitive element 55 outputs signals indicating blood pressure and pulse of the user, to the controller 58. For the memory 56 which stores information corresponding to the signals that have been output, a nonvolatile memory can be used, for example. The information transmitter 57 converts necessary information into radio waves according to the signals from the controller 58, and then, radiates the radio waves. The switch SW1 is used for turning on or off, the biological information measuring device 50. The temperature sensor 53, the pressure sensitive element 55, the memory 56, the information transmitter 57, the switch SW1, and the controller 58 are mounted on, for example, a flexible circuit board; and they are electrically connected to one another according to a wire interconnection pattern formed on the circuit board surface.

The controller 58 includes, for example, a CPU (Central Processing Unit) for performing a predetermined computation, a ROM (Read Only Memory) in which the control program of the device is stored, a RAM (Random Access Memory) for temporarily storing data, and peripheral circuits; and controls the operation of each component of the biological information measuring device 50, by running the control program stored in the ROM.

Figure 7:
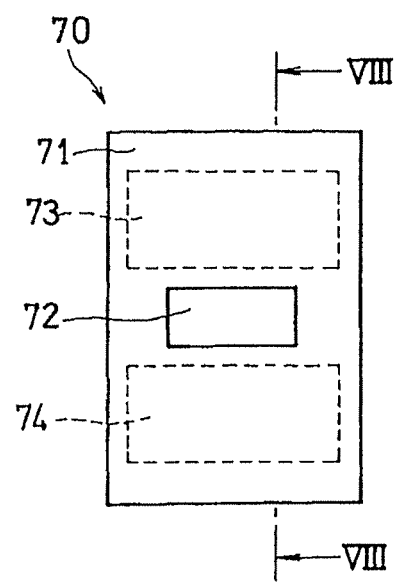
FIG. 7 is a top view conceptually showing one example of an iontophoretic dermal administration device.
Figure 8:
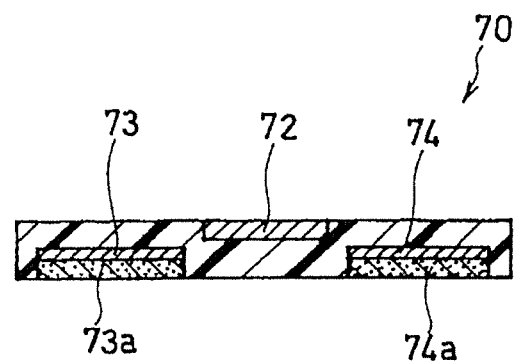
FIG. 8 is a schematic vertical sectional view of the iontophoretic dermal administration device taken along line VIII-VIII.
Figure 9:
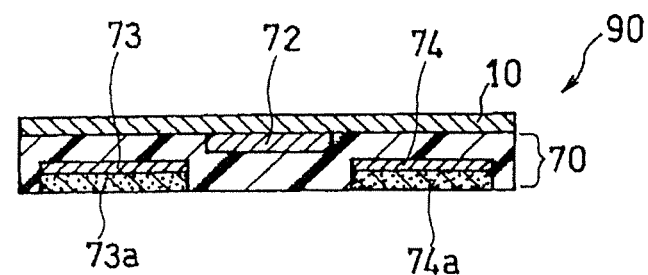
FIG. 9 is a schematic vertical sectional view of one example of a battery device in which the iontophoretic dermal administration device is integrated with the thin battery.

FIG. 7 is a top view conceptually showing one example of an iontophoretic dermal administration device, and FIG. 8 is a schematic vertical sectional view of the same. FIG. 8 is a vertical sectional view of FIG. 7 taken along line VIII-VIII. FIG. 9 is a vertical sectional view, corresponding to FIG. 8, of one example of a battery device 90 in which the iontophoretic dermal administration device is integrated with the thin battery 10.

An iontophoretic dermal administration device 70 includes a holding member 71 in sheet form for holding the components of the device 70. The holding member 71 is made of a flexible material. Embedded inside the holding member 71, are a semiconductor element 72 for controlling electric power from the thin battery; a pair of a flat electrode 73 and a flat electrode 74; and a pair of a reservoir 73a and a reservoir 74a which face the electrodes 73 and 74, respectively. The reservoirs 73a and 74a are both made of a gelled material capable of conducting electricity; and an ionic medicine is sealed inside either one of the two reservoirs. The semiconductor element 72 is an element having a rectifying effect, as with, for example, a constant-current diode; and is connected in series with each of the electrodes. The reservoirs 73a and 74a are directly attached to the skin of a living body such as a human body.

When voltage is applied to the pass between two electrodes, ions of the ionic medicine placed therebetween become accelerated, and permeates the subcutaneous tissue. Permeation of the medicine through the skin is controlled by the semiconductor device 72.

There are instances where the thickness of the battery device 90 in sheet form is somewhat thicker than the thin battery. However, it is preferably 1 mm or thinner, considering flexibility as well as comfort to a human body when it is attached thereto. However, note that the battery device, as with the thin battery, could realize a relatively good attachment if it has a thickness of about 5 mm or thinner. Here also, when the value of the thickness of the battery device differs depending on where it is measured, the maximum value measured is regarded as the thickness of the battery device.

In the following, the present invention will be specifically described with reference to Examples. However, note that the present invention is not limited to these Examples.

Example 1

A thin battery having a structure as shown in FIG. 1, was produced in the following manner.

(1) Production of Negative Electrode Current Collector Sheet

A 25 μm-thick electrolytic copper foil was formed under the following conditions.

Electrolytic bath: copper sulfate solution (copper concentration: 100 g/L, sulfuric acid concentration: 100 g/L)

Anode: titanium with noble metal oxide coating

Cathode: titanium rotation drum

Current density: 50 A/dm$^2$

Bath temperature: 50° C.

With respect to the electrolytic copper foil, surface roughnesses of the matte surface and the gloss surface were 0.5 μm and 0.1 μm, respectively. The surface roughnesses were measured with a surface roughness meter (Model SE-3C, available from Kosaka Laboratory Ltd.).

Next, both surfaces of the electrolytic copper foil were subjected to bright plating under the following conditions.

Composition of plating bath: copper concentration of 55 g/L, sulfuric acid concentration of 55 g/L, chloride ion concentration of 90 ppm, and a bright copper plating additive for decoration (Cupracid 210, available from Nihon Schering K.K.)

Counter electrode: phosphorus-containing copper plate

Current density: 6 A/dm$^2$

Bath temperature: 27° C.

After the bright plating, the matte surface of the electrolytic copper foil had a surface roughness of 0.3 μm, and the glossy surface thereof had a surface roughness of 0.05 μm.

Furthermore, with use of a suction-type air blasting apparatus (a suction-type blasting machine Model B-0, with nozzle diameter of 9 mm, available from Atsuchi Tekko Co., Ltd.), blasting was applied to both surfaces of the electrolytic copper foil that were bright plated.

Blasting was followed by air-blowing.

Blasting particles: alundum particles with average particle size of 3 μm

Ejection pressure: 0.4 MPa

Ejection distance: 100 mm

Blasting time: 20 sec (2) Production of Negative Electrode

A lithium metal foil (31 mm×31 mm, thickness: 20 μm) serving as a negative electrode active material layer 22, was pressed fitted at a line pressure of 100 N/cm, onto one surface (i.e., matte surface with higher surface roughness, surface roughness: 2.6 μm) of a negative electrode current collector sheet 21 punched out to have a protruding portion 23, the sheet 21 and the portion 23 having sizes of 31×31 mm and 12 mm×5 mm, respectively; and resulted in obtaining a negative electrode 20. Thereafter, a negative lead 3 made of copper, 3.0 mm in width and 20 mm in length, was ultrasonically welded to the protruding portion 23.

Note that the process of "(2) Production of Negative Electrode" to "(6) Assembling of Battery" was performed in an atmosphere with a dew point controlled at −30° C. or lower.

(3) Production of Positive Electrode

Mixing of electrolytic manganese dioxide serving as a positive electrode active material, having been heat treated at 350° C.; acetylene black serving as a conductive agent; and a N-methyl-2-pyrrolidone (NMP) solution which contains polyvinylidene fluoride (PVDF) serving as a binder (#8500 available from Kureha Corporation), was performed, with the mass ratio of manganese dioxide:acetylene black:PVDF being 100:5:5. Then, an appropriate amount of NMP was added to the mixture, to obtain a positive electrode material mixture in paste form.

The positive electrode material mixture was applied to one surface of an aluminum foil (thickness: 15 μm) serving as a positive electrode current collector sheet 31; and then, the resultant was dried at 85° C. for 10 minutes. Thereafter, the positive electrode material mixture, together with the current collector sheet, was compressed with a roll pressing machine at a line pressure of 12,000 N/cm, to obtain a positive electrode 30 having a positive electrode active material layer 32.

The positive electrode 30 was cut out to have a protruding portion 33, the electrode 30 and the portion 33 having sizes of 29 mm×29 mm and 12 mm×5 mm, respectively; and the resultant was dried under reduced pressure, at 120° C., for 2 hours. Thereafter, a positive lead 14 made of aluminum, 5 mm in width and 20 mm in length, was ultrasonically welded to the protruding portion 33.

(4) Formation of Electrolyte Layer Including Gel Polymer Electrolyte

In a non-aqueous solvent that was obtained by mixing propylene carbonate (PC) and dimethoxyethane (DME) at a mass ratio of 6:4, lithium perchlorate (LiClO$_4$) serving as a lithium salt was dissolved such that its concentration became 1 mol/kg, thereby preparing a liquid electrolyte. Meanwhile, as a polymeric material to serve as a matrix, vinylidene fluoride-hexafluoropropylene copolymer (hexafluoropropylene content: 7%) was prepared. These were mixed together, with the ratio between the polymeric material and the liquid electrolyte being 1:10 (mass ratio). Dimethyl carbonate (DMC) serving as a solvent was further added to the mixture, thereby preparing a gel polymer electrolyte solution.

The obtained gel polymer electrolyte solution was applied to both surfaces of a 9 μm-thick separator serving as a support, and the solvent was volatilized, thereby allowing the separator to be impregnated with the gel polymer electrolyte. For the separator, a microporous film made of polyethylene was used. Moreover, the gel polymer electrolyte solution was also uniformly applied to the positive electrode active material layer, and the solvent was volatilized, thereby allowing the positive electrode active material layer to be impregnated with the gel polymer electrolyte.

(5) Production of Electrode Assembly

The negative electrode, and the positive electrode impregnated with the gel polymer electrolye, were stacked, such that the negative electrode active material layer and the positive electrode active material layer faced each other, with the separator impregnated with the gel polymer electrolyte interposed therebetween. Thereafter, the stack was hot pressed for 1 minute at 90° C. and 0.5 MPa, thereby obtaining an electrode assembly 12.

(6) Assembling of Battery

The electrode assembly 12 was inserted in a housing 11 made of a laminate film and having a tubular form. At the time of insertion, the negative lead 13 and the positive lead 14 were made to extend out from one opening of the housing 11, thereby allowing the negative lead 13 and the positive lead 14 to partially be out from the housing 11 and thus exposed. The exposed parts of the negative lead 13 and the positive lead 14 serve as an external positive terminal and an external negative terminal, respectively.

For the laminate film, a film material (total thickness: 110 μm) including an aluminum film (thickness: 40 μm) serving as a barrier layer, polypropylene (thickness: 45 μm) serving as a sealing layer, and a nylon layer (thickness: 25 μm) serving as a protective layer, was used.

The one opening of the housing, from which the negative lead 13 and the positive lead 14 were made to extend out, was closed by thermal welding. Then, the housing 11, with the electrode assembly 12 accommodated therein, was transferred and placed inside a chamber filled with dry air. Then, the pressure inside the chamber was reduced to 660 mmHg, and maintained for 10 seconds. Thereafter, inside the chamber, the other opening of the housing 11 was closed by thermal welding, thereby sealing the electrode assembly 12 inside the housing 11. In this manner, production was completed for a 390 μm-thick, 45 mm×45 mm thin battery (Battery No. 1).

The total area S of the two main flat surfaces of the inner housing surface, facing the end surfaces of the electrode assembly on both sides in a thickness direction thereof, was 23.0 cm$^2$. The thickness of the thin battery was measured with a dial gauge.

Example 2

Battery No. 2 (thickness: 390 μm) was produced in the same manner as Battery No. 1, except for setting the pressure inside the chamber to 130 mmHg.

Example 3

Battery No. 3 (thickness: 390 μm) was produced in the same manner as Battery No. 1, except for setting the pressure inside the chamber to 260 mmHg.

Example 4

Battery No. 4 (thickness: 400 μm) was produced in the same manner as Battery No. 1, except for setting the pressure inside the chamber to 880 mmHg.

Example 5

Battery No. 5 (thickness: 390 μm) was produced in the same manner as Battery No. 1, except for changing the gas inside the chamber to argon.

Example 6

Battery No. 6 (thickness: 390 μm) was produced in the same manner as Battery No. 1, except for changing the gas inside the chamber to a mixed gas of dry air and argon.

Comparative Example 1

Battery No. 7 (thickness: 390 μm) was produced in the same manner as Battery No. 1, except for setting the pressure inside the chamber to 20 mmHg. The state of reduced pressure at 20 mmHg or lower can be regarded as a vacuum. In this case, air is considered to be present in minimal space that can be created along the periphery of the electrode assembly, and does not have a lubricating effect.

Example 7

Battery No. 8 (thickness: 430 μm) was produced in the same manner as Battery No. 1, except for setting the pressure inside the chamber to 1,000 mmHg.

(7) Analysis of Gas Inside Battery

Quantitative and qualitative analyses were made on the gas present in the produced battery, with use of a gas chromatograph (CP-4900) equipped with a thermal conductivity detector (TCD), available from Varian Medical Systems, Inc.

First, a thin battery was put into a sampling bag and sealed, and air inside the bag was displaced by an argon gas or a helium gas. Subsequently, the thin battery was opened inside the bag, and the gas present in the thin battery was sufficiently mixed with the argon or helium gas inside the bag. Thereafter, a part of the gas inside the bag was injected into the gas chromatograph as a sample gas, and the gas components were each quantitatively and qualitatively analyzed. Note that for the column, a MS-5A column in which an argon or helium gas serves as a carrier gas, and a Poropak-Q (PPQ) column in which a helium gas serves as a carrier gas, were used.

The ratio V/S was calculated from the volume V μL of the inert gas inside the battery, that was quantitated; and the total area S of the two main flat surfaces of the inner housing surface, facing the end surfaces of the electrode assembly on both sides in a thickness direction thereof. The results are shown in Table 1.

Other gas components inside the battery, being, for example helium, neon, argon, krypton, xenon, and radon, were undetectable.

TABLE 1

| | Results of Gas Analysis | | | |
|---|---|---|---|---|
| Battery No. | $N_2$ amount (μL) | Ar amount (μL) | Inert gas amount (μL) | V/S value |
| 1 | 113.7 | 1.4 | 115.1 | 5.0 |
| 2 | 11.4 | 0.1 | 11.5 | 0.5 |
| 3 | 22.7 | 0.3 | 23.0 | 1.0 |
| 4 | 159.1 | 1.9 | 162.0 | 7.0 |
| 5 | 0.0 | 115.1 | 115.1 | 5.0 |
| 6 | 50.8 | 64.3 | 115.1 | 5.0 |
| 7 | 6.8 | 0.1 | 6.9 | 0.3 |
| 8 | 181.9 | 2.2 | 184.1 | 8.0 |

[Evaluation]

(1) Evaluation of Flexibility (Three-Point Bending Test)

Flexibility of the thin battery was evaluated by performing a three-point bending test, with use of a Tensilon universal testing machine (RTC-1150A, available from Orientec Co.)

Figure 10:
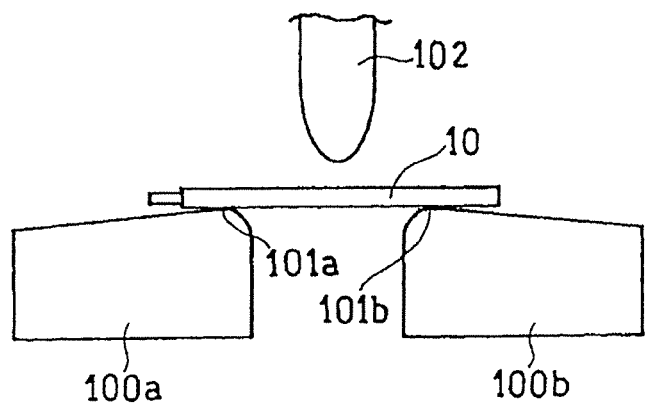
FIG. 10 is a side view schematically showing a state of the thin battery under test and a test device, during evaluation on flexibility of the thin batteries according to the Examples of the present invention.
Figure 11:
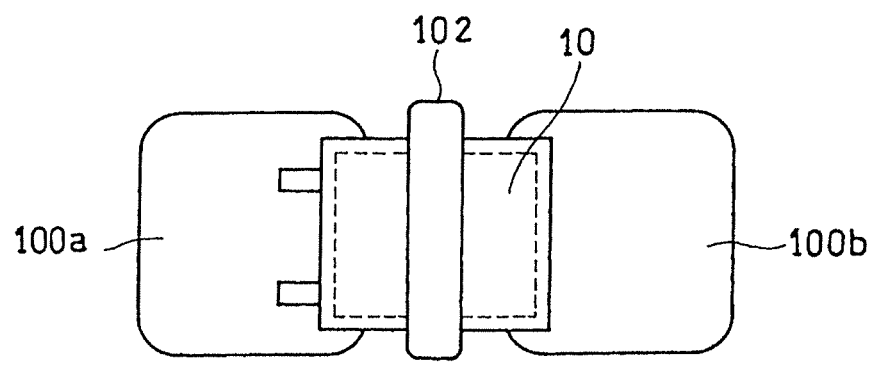
FIG. 11 is a top view schematically showing the state shown in FIG. 10.

Specifically, as shown in FIGS. 10 and 11, two thermally-welded and sealed end portions of the thin battery 10 were placed on mounts 100a and 100b, respectively, at supporting points 101a and 101b located at the upper surfaces of the mounts 100a and 100b, respectively. Then, from above, a rounded tip of a flat indenter 102 was brought into line contact with the center of the thin battery 10 supported at the supporting points 101a and 101b; and pressure was thus applied to the center portion of the battery 10 by the indenter 102.

Portions of the supporting points 101a and 101b on the mounts 100a and 100b each had curved surfaces with a 2 mm radius of curvature. The distance between the supporting points was 30 mm, and the tip of the indenter 102 had a 5 mm radius of curvature. The rate of load application was 100 mm/min. Here, the maximum load measured was referred to as the index for indicating flexibility of the thin battery. A smaller maximum load enabled a better flexibility.

(2) Evaluation of Bending Resistance

With respect to Batteries No. 1 to 8, two of each were prepared, and first, internal resistance was measured for one battery before testing. Thereafter, a discharge test was performed thereon under the following conditions, to obtain discharge capacity A.

Ambient temperature: 25° C.

Discharge current density: 250 μA/cm² (value of current per unit area of the positive electrode)

Discharge cutoff voltage: 1.8 V

Next, a bending test was performed on the other battery in an undischarged state.

Figure 12:
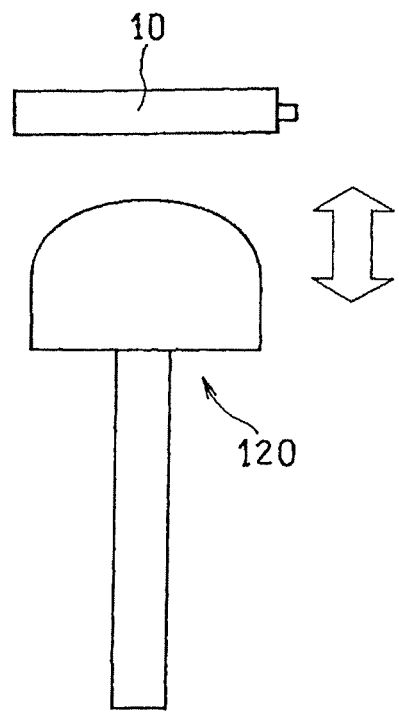
FIG. 12 is side view schematically showing a state of the thin battery under test and a test jig, during evaluation on bending properties of the thin batteries according to the Examples of the present invention.

Specifically, as shown in FIG. 12, a process was repeated 10,000 times, the process including pressing onto the thin battery 10, a jig 120 having a curved surface with a 20 mm radius of curvature, thereby bending the battery such that it followed the curved surface of the jig 120; and then, separating the jig 120 from the battery, thereby returning the battery to its original state.

For the other battery, which had been applied with bending load as described above, internal resistance and discharge capacity B were obtained in the same manner as for the one battery before testing. Then, the capacity retention rate of the discharge capacity B after testing, relative to the discharge capacity A before testing, was obtained.

(3) Evaluation of Leakage Resistance

With respect to the thin batteries, five of each were prepared. A hole 0.5 mm in diameter was opened in the housing 1 of these batteries, and then they were pressed at a pressure of 5 MPa. By the above, the number of the batteries with electrolyte leakage was obtained.

Results of the evaluations for flexibility, bending resistance, and leakage resistance, are shown in Table 2.

TABLE 2

| | | Bending Resistance | | | Leakage |
|---|---|---|---|---|---|
| Battery No. | Flexibility Maximum Load (N) | Internal Resistance Before Testing (Ω) | Internal Resistance After Testing (Ω) | Discharge Capacity Retention Rate (%) | Resistance Number of Batteries with Leakage |
| 1 | 1.5 | 1.4 | 1.4 | 99 | 0/5 |
| 2 | 3.1 | 1.3 | 1.3 | 99 | 0/5 |

TABLE 2-continued

| | | Bending Resistance | | | Leakage |
|---|---|---|---|---|---|
| Battery No. | Flexibility Maximum Load (N) | Internal Resistance Before Testing (Ω) | Internal Resistance After Testing (Ω) | Discharge Capacity Retention Rate (%) | Resistance Number of Batteries with Leakage |
| 3 | 2.4 | 1.3 | 1.4 | 99 | 0/5 |
| 4 | 1.5 | 1.6 | 1.6 | 99 | 0/5 |
| 5 | 1.5 | 1.4 | 1.4 | 99 | 0/5 |
| 6 | 1.5 | 1.4 | 1.4 | 99 | 0/5 |
| 7 | 8.1 | 1.2 | 6.4 | 71 | 0/5 |
| 8 | 1.5 | 4.5 | 9.8 | 69 | 0/5 |

As shown in Table 2, it was found that Batteries No. 1 to 6, in which the V/S value was 0.50 μL/cm$^2$ or higher, had a smaller maximum load when flexibility was evaluated and thus had a better flexibility, compared to Battery No. 7 in which the V/S value was lower than 0.50 μL/cm$^2$. Moreover, Batteries No. 1 to 6 had a smaller internal resistance before and after the bending test, and also had a higher capacity retention rate after the bending test, compared to Battery No. 8 in which the V/S value exceeded 7.0 μL/cm$^2$. Moreover, all of the batteries had high leakage resistance, and no leakage was observed in any of them.

Here, the thin battery had a lower flexibility when V/S<0.50 μL/cm$^2$, presumably because space was not created at the interface between the inner housing surface and the electrode assembly, thereby causing larger friction therebetween; and, on the other hand, had lower bending resistance when V/S>7.0 μL/cm$^2$, presumably because force applied from the outside to the electrode assembly through the housing became smaller, thereby reducing adhesion of the electrode assembly thereto.

Both Battery No. 5, in which the inert gas filled was composed solely of argon, and Battery No. 6, in which the inert gas filled was a mixed gas of dry air and argon, exhibited about the same excellent degree of flexibility, bending resistance, and leakage resistance. From these results, it can be concluded that the same results are obtainable regardless of the kind of materials used, as long as the materials used do not affect the positive and negative electrode active materials. It is easy to obtain inert gases such as nitrogen, argon, and a mixed gas thereof.

Next, thin batteries were produced, with various changes made to the constitution of the electrolyte layer or the surface roughness of the negative electrode current collector sheet. In Examples 8 to 12, the V/S ratio was fixed at 5.0 μL/cm$^2$, a lithium metal foil was used as the negative electrode active material layer, and MnO$_2$ was used as the positive electrode active material.

Example 8

Battery No. 9 was produced in the same manner as Battery No. 1, except for using an electrode assembly produced in the following manner.

First, 10 g of polyethylene oxide with a viscometric average molecular weight of 100,000 (available from Sigma-Aldrich Corporation) and 10 g of dimethoxyethane (DME) were dissolved in 100 g of acetonitrile, to obtain an acetonitrile solution of polyethylene oxide. LiN(CF$_3$SO$_2$)$_2$ serving as a lithium salt was added to the acetonitrile solution, such that the mole ratio [Li]/[EO] between the lithium ion concentration [Li] and the ether oxygen concentration in the polyethylene oxide [EO] became 0.05. In this manner, an acetonitrile solution of a dry polymer electrolyte was obtained.

The obtained acetonitrile solution of the dry polymer electrolyte was applied to the surface of the lithium metal foil serving as the negative electrode active material layer 22, and also applied to the surface of the positive electrode active material layer 32. Then, the resultant was vacuum dried in room temperature for 48 hours, to remove the acetonitrile and DME, being solvent components. Thus, a dry polymer electrolyte layer was formed on the surface of the negative electrode active material layer 22 and the surface of the positive electrode active material layer 32.

The negative electrode and the positive electrode were stacked, such that the positive electrode active material layer and the negative electrode active material layer faced each other with the dry polymer electrolyte interposed therebetween. Thereafter, the stack was hot pressed for 1 minute at 90° C. and 0.5 MPa, thereby obtaining an electrode assembly 12.

Example 9

Battery No. 10 was produced in the same manner as Battery No. 1, except for changing the electrolyte layer to a liquid electrolyte. That is, the impregnations of the gel polymer electrolyte into the positive electrode and the separator were not performed, and the electrode assembly was produced by stacking the negative and positive electrodes with the separator therebetween. However, note that 500 μL of the liquid electrolyte was injected into the housing from the other opening of the two openings thereof, before closing this opening by thermal welding. Thereafter, this opening of the housing 11 was closed by thermal welding, thus sealing the electrode assembly 12 inside the housing 11, and completing production of a thin battery (Battery No. 10).

For the liquid electrolyte, a non-aqueous solvent with LiClO$_4$ dissolved therein at a concentration of 1 mol/L, was used. As the non-aqueous solvent, a mixed solvent of propylene carbonate and dimethoxyethane (volume ratio of 1:1) was used.

Example 10

Battery No. 11 was produced in the same manner as Example 1, except for using as the negative electrode current collector sheet, an electrolytic copper foil with a 0.3 μm surface roughness, the foil formed without performing blasting.

Example 11

Battery No. 12 was produced in the same manner as Example 1, except for using as the negative electrode current collector sheet, an electrolytic copper foil with a 0.4 μm surface roughness, the foil formed with the injection pressure during blasting changed to 0.25 MPa.

Example 12

Battery No. 13 was produced in the same manner as Example 1, except for using as the negative electrode current collector sheet, an electrolytic copper foil with a 10 μm surface roughness, the foil formed with the injection pressure during blasting changed to 0.50 MPa.

Example 13

Battery No. 14 was produced in the same manner as Example 1, except for using as the negative electrode current collector sheet, an electrolytic copper foil with a 12 μm surface roughness, the foil formed with the injection pressure during blasting changed to 0.60 MPa.

Here, Batteries No. 9 to 14 were evaluated on their flexibility, bending resistance, and leakage resistance. The evaluation results are shown in Table 3.

Next, a study was made on instances where the electrode active material layer was changed. Examples 14 and 15 both had a fixed V/S value of 5.0 μL/cm$^2$, and a fixed surface roughness of the negative electrode current collector sheet, of 2.6 μm; and used a gel polymer electrolyte for the electrolyte layer.

TABLE 3

| Battery Constitution | | | | Bending Resistance | | | Leakage |
|---|---|---|---|---|---|---|---|
| Battery No. | Electrolyte Layer | Surface Roughness of Negative Electrode Current Collector Sheet (μm) | Flexibility Maximum Load (N) | Internal Resistance Before Test (Ω) | Internal Resistance After Test (Ω) | Capacity Retention Rate (%) | Resistance Number of Batteries with Leakage |
| 1 | gel polymer electrolyte | 2.6 | 1.5 | 1.4 | 1.4 | 99 | 0/5 |
| 9 | dry polymer electrolyte | 2.6 | 1.8 | 5.2 | 5.2 | 91 | 0/5 |
| 10 | liquid electrolyte | 2.6 | 1.6 | 1.4 | 1.9 | 89 | 1/5 |
| 11 | gel polymer electrolyte | 0.3 | 1.5 | 1.7 | 2.0 | 93 | 0/5 |
| 12 | gel polymer electrolyte | 0.4 | 1.5 | 1.4 | 1.4 | 99 | 0/5 |
| 13 | gel polymer electrolyte | 10 | 1.5 | 1.4 | 1.4 | 99 | 0/5 |
| 14 | gel polymer electrolyte | 12 | 1.5 | 1.4 | 2.3 | 88 | 0/5 |

As shown in Table 3, it was found that Batteries No. 1, 9, and 10 which used a gel polymer electrolyte, a dry polymer electrolyte, and a liquid electrolyte, respectively, exhibited excellent flexibility and bending resistance. Among them, Batteries No. 1 and No. 9 which used a gel polymer electrolyte and a dry polymer electrolyte, respectively, showed no leakage after the bending test, and were found to also have excellent leakage resistance. When the electrolyte layer included a viscoelastic electrolyte such as a dry polymer electrolyte or a gel polymer electrolyte, the battery including such an electrolyte layer showed no increase in internal resistance or resistance in capacity retention rate, and was found to exhibit excellent bending resistance. This is presumably due to the high degree of adhesion between the electrodes in the electrode assembly, and to the high flexibility given to the battery.

Moreover, as shown in Table 3, Batteries No. 1, 12, and No. 13, in which surface roughness of the negative electrode current collector sheet was 0.4 μm or higher and 10 μm or lower, were found to exhibit better bending properties, compared to Batteries No. 11 and 14, in which the surface roughness thereof was 0.3 μm and 12 μm, respectively. This is presumably because the surface roughness of 0.4 μm or higher and 10 μm or lower enables realizing a better anchor effect and obtaining higher adhesion between the negative electrode current collector sheet and the negative electrode active material layer. When the surface roughness of the negative electrode current collector sheet is lower than 0.4 μm, it is presumed that the anchor effect between the negative electrode current collector sheet and the negative electrode active material layer is not easily obtained, and there may be instances of partial separation due to the bending test. On the other hand, when the surface roughness thereof exceeds 10 μm, it is presumed that stress is locally applied to the negative electrode current collector due to the bending test, and there may be instances of partial damage caused thereto.

Example 14

Battery No. 15 was produced in the same manner as Battery No. 1, except for using as the negative electrode active material layer, a lithium alloy foil containing 3 mass % of Al.

Example 15

Battery No. 16 was produced in the same manner as Battery No. 1, except for using as the negative electrode active material, graphite having a volume-based average particle size of 20 μm; and using as the positive electrode active material, LiNi$_{0.82}$Co$_{0.15}$Al$_{0.03}$O$_2$ (hereinafter referred to as LNCA) having a volume-based average particle size of 10 μm.

The negative electrode active material layer was formed by preparing a slurry containing the negative electrode active material, styrene-butadiene rubber, and carboxylmethylcellulose at a mass ratio of 98:1:1, using water as a dispersant; applying the obtained slurry to an electrolytic copper foil, followed by drying; and then rolling the resultant.

Here, Batteries No. 15 and 16 were evaluated on their flexibility, bending resistance, and leakage resistance. The evaluation results are shown in Table 4.

The bending test was performed on Battery No. 16 in a charged state, the charged state obtained by charging and discharging the battery for 2 cycles between a 4.2 V cutoff voltage and a 2.5 V cutoff voltage; and thereafter, charging the battery for the 3$^{rd}$ cycle, to a 4.2 V cutoff voltage. Also, internal resistance of the battery was measured before and after the bending test. For the capacity retention rate, a calculation was made to obtain, in percentage, the retention rate of the discharge capacity at the 3$^{rd}$ cycle after the bending test, relative to the discharge capacity at the 2$^{nd}$ cycle ([discharge capacity at 3$^{rd}$ cycle/discharge capacity at 2$^{nd}$ cycle]×100).

TABLE 4

| Battery No. | Battery Constitution | | Flexibility Maximum Load (N) | Bending Resistance | | | Leakage Resistance Number of Batteries with Leakage |
|---|---|---|---|---|---|---|---|
| | Negative Electrode Active Material | Positive Electrode Active Material | | Internal Resistance Before Test (Ω) | Internal Resistance After Test (Ω) | Discharge Capacity Retention Rate (%) | |
| 1 | Li | $MnO_2$ | 1.5 | 1.4 | 1.4 | 99 | 0/5 |
| 15 | Li—Al alloy | $MnO_2$ | 1.7 | 1.4 | 1.4 | 99 | 0/5 |
| 16 | graphite | LNCA | 1.6 | 1.2 | 1.2 | 99 | 0/5 |

As shown in Table 4, Batteries No. 15 and 16 were found to exhibit excellent flexibility, bending resistance, and leakage resistance, as with Battery No. 1. Moreover, the same results as in primary batteries were found to be obtained in secondary batteries as well.

INDUSTRIAL APPLICABILITY

The thin battery of the present invention is suited, for example, for applications such as installation in devices, etc. which operate in contact with a living body and thus requires high flexibility; and can suppress feeling of discomfort and abnormalness for the user when using such devices. As a result, it becomes possible for the user to use such devices without feeling any abnormalness, even if used for a long period of time.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: thin battery, 11: housing, 12: electrode assembly; 13: negative lead, 14: positive lead, 20: negative electrode, 21: negative electrode current collector sheet, 22: negative electrode active material layer, 23: protruding portion of negative electrode current collector sheet, 30: positive electrode, 31: positive electrode current collector sheet, 32: positive electrode active material layer, 33: protruding portion of positive electrode current collector sheet, 40: laminate film, 41: barrier layer, 42a & 42b: resin layer, 50: biological information measurement device, 51: holding member in sheet form, 52: battery device, 53: temperature sensor, 55: pressure sensitive element, 56: memory, 57: information transmitter, SW1: button switch, 58: controller, 60: adhesive, 70: iontophoretic dermal administration device, 71: holding member in sheet form, 72: semiconductor element, 73 & 74: electrode, 73a & 74a: reservoir, 90: battery device, 100a & 100b: mount for three-point bending test, 101a & 101b: supporting point, 102: indenter for three-point bending test, 120: jig for bending test

The invention claimed is:

1. A thin battery comprising an electrode assembly in sheet form and a housing for accommodating the electrode assembly,
the electrode assembly including a positive electrode, a negative electrode, and an electrolyte layer interposed between the positive and negative electrodes, and
a lubricating material with a lubricating effect, being interposed between an inner surface of the housing and the electrode assembly,
wherein the thin battery has a thickness of 5 mm or less and is flexible,
the housing having an upper main surface and a lower main surface, and a plurality of side edge portions opposing outer side edges of the electrode assembly, the plurality of side edge portions surrounding the outer side edges of the electrode assembly when viewed in plan, said side edge portions of the housing being flexible, and
the lubricating material is present, at least, between entire end surfaces of the electrode assembly on both sides in a thickness direction thereof, and two main flat surfaces of the inner surface of the housing which face the end surfaces, respectively.

2. The thin battery in accordance with claim 1, wherein the lubricating material is an inert gas.

3. The thin battery in accordance with claim 2, wherein the inert gas includes at least one of nitrogen and argon.

4. The thin battery in accordance with claim 1, wherein a ratio V/S of a volume V μL of the lubricating material filled in the housing, relative to a total area S $cm^2$ of the two main flat surfaces, is 0.5 μL/$cm^2$ or more and 7 μL/$cm^2$ or less.

5. The thin battery in accordance with claim 1, wherein the electrolyte layer includes a dry polymer electrolyte or a gel polymer electrolyte.

6. The thin battery in accordance with claim 1,
wherein the negative electrode includes a negative electrode current collector sheet, and an active material layer adhering to one or both surfaces of the negative electrode current collector sheet,
the active material layer is a lithium metal layer or a lithium alloy layer, and
the negative electrode current collector sheet is an electrolytic copper foil, and a surface roughness of the electrolytic copper foil is 0.4 μm or more and 10 μm or less.

7. The thin battery in accordance with claim 1, wherein the housing is formed from a laminate film, the laminate film including a water vapor barrier layer and a resin layer formed on one or both surfaces of the barrier layer, and the barrier layer being a metal layer or a ceramic layer.

8. The thin battery in accordance with claim 1 having a thickness of 1 mm or less.

9. A battery device comprising the thin battery in accordance with claim 1 and an electronic device which is driven by power supplied from the thin battery, the thin battery and the electronic device being integrated together to form a sheet.

* * * * *